US008849034B2

(12) United States Patent
Bhaskarabhatla

(10) Patent No.: US 8,849,034 B2
(45) Date of Patent: Sep. 30, 2014

(54) SYSTEM, METHOD, AND APPARATUS FOR TRIGGERING RECOGNITION OF A HANDWRITTEN SHAPE

(75) Inventor: Ajay Bhaskarabhatla, Visakhapatnam (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 2666 days.

(21) Appl. No.: 11/008,434

(22) Filed: Dec. 9, 2004

(65) Prior Publication Data
US 2006/0126936 A1 Jun. 15, 2006

(51) Int. Cl.
*G06K 9/00* (2006.01)
*G06K 9/22* (2006.01)

(52) U.S. Cl.
CPC ..................... *G06K 9/222* (2013.01)
USPC ............ 382/187; 382/202; 382/321; 345/173

(58) Field of Classification Search
USPC ............................ 382/187, 202, 321; 345/173
See application file for complete search history.

(56) References Cited

U.S. PATENT DOCUMENTS

| | | | |
|---|---|---|---|
| 4,680,804 A * | 7/1987 | Kuzunuki et al. | ............. 382/185 |
| 6,289,303 B1 * | 9/2001 | Atkin et al. | ........................ 704/8 |
| 6,647,145 B1 | 11/2003 | Gay | |
| 2003/0152268 A1 | 8/2003 | Seto et al. | |
| 2003/0215142 A1 | 11/2003 | Gounares et al. | |
| 2005/0192802 A1 * | 9/2005 | Robinson et al. | ............. 704/240 |

FOREIGN PATENT DOCUMENTS

| | | | | |
|---|---|---|---|---|
| EP | 0 686 291 B1 * | 6/1995 | ............... | G06K 9/00 |
| EP | 0689155 | 12/1995 | | |

OTHER PUBLICATIONS

Namboordiri A M et al. "Online Handwritten Script Recognition" IEEE Transactions on Pattern Analysis and Machine Intelligence, IEEE Services Ctr, vol. 26, No. 1, Jan. 2004, pp. 124-130, XP001185862, ISSN: 0162-4828, chapter 3.

* cited by examiner

*Primary Examiner* — Chan Park
*Assistant Examiner* — Eueng-Nan Yeh

(57) ABSTRACT

A technique that uses repetitive and reliably recognizable parts of handwriting, during digital handwriting data entry, to trigger recognition of digital ink and to repurpose handwriting task area properties. In one example embodiment, this is achieved by drawing one or more delayed strokes of a desired sub-word unit using a stylus on a touch screen. An associated data of the drawn one or more strokes is inputted via the touch screen into a handwriting recognition engine. A first trigger stroke in the drawn one or more strokes that can be used to trigger the sub-word unit recognition by the handwriting recognition engine is then determined. The sub-word unit recognition is then triggered for the drawn one or more strokes based on the determined first trigger stroke by the handwriting recognition engine.

35 Claims, 5 Drawing Sheets

SYSTEM, METHOD, AND APPARATUS FOR TRIGGERING RECOGNITION OF A HANDWRITTEN SHAPE

TECHNICAL FIELD OF THE INVENTION

The present invention relates generally to a user interface in a computer system, and more particularly relates to triggering handwriting recognition during data entry into a computer.

BACKGROUND OF THE INVENTION

The character recognition approach requires writing characters using a pen to naturally write an entire character on a graphics tablet. In this approach, the character recognition technique attempts to find the character that most closely matches the strokes entered on the tablet and returns the results. The faster the results are returned, the better a user's experience will be. Conventional character recognition techniques typically have a fundamental bottleneck in detecting when the user finishes writing. This problem is even more severe when writing characters of scripts, such as Indic, Arabic, South-east Asian, and the like, which have complex shapes and can require writing these shapes using multiple strokes.

Conventional ways for detecting that a user has finished writing and that character recognition should be triggered typically include one or more of the following techniques:

First, a timer is set upon detecting that the user has lifted the pen off the character recognition surface, such as the graphics tablet, which be referred to as a pen-up event. If a pen-down event, which occurs when a user places the pen on the character recognition surface, is not detected before the timer expires, it is inferred that the user has finished writing. The problem with this technique is preferred timer values can vary from user to user depending on the users' writing speeds.

Second, if the user touches outside of a current character recognition task area or inside a next task area, the pen-down event is interpreted as completion of the handwriting to be recognized from the current task area. The problem with this technique is it does not take advantage of the time between when the user lifts the pen from the current task area and when the user puts the pen down in the next task area.

Third, if the user presses a soft key, labeled "end" or the like, the button-pressed event is interpreted as an indication from the user that the user is finished writing and that recognition should be triggered. This technique reduces the quality of the user's experience by requiring many button presses. The repeated hand movement associated with these button presses can get tiresome, and can be a significant overhead from the user's point of view, and can disturb the user's train of thought in composing sentences.

The above conventional techniques, for determining when a user has stopped writing in a character recognition task, can have even more shortcomings, when writing characters of scripts, such as Indic, Arabic, South-east Asian, and the like, which have complex shapes and can require multiple strokes to write a single character or a sub-word unit.

SUMMARY OF THE INVENTION

According to an aspect of the subject matter, there is provided a method for triggering handwriting recognition upon completion of a shape entry into a computer, the method including the steps of drawing one or more strokes of a desired shape using a stylus on a touch screen, inputting an associated data of the one or more strokes via the touch screen into a handwriting recognition engine, determining a trigger stroke in the drawn one or more strokes that can be used to trigger shape recognition by the handwriting recognition engine, and triggering shape recognition for the drawn shape based on the determined trigger stroke by the handwriting recognition engine.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The term "sub-word unit" in Devanagari script refers to an "akshara" or "samyukthakshara". The term "sub-word" unit refers to a member of alphabetic, legographic, and/or phonetic/syllabic character set, which includes syllables, alphabets, numerals, punctuation marks, consonants, consonant modifiers, vowels, vowel modifiers, and special characters, and/or any combination thereof. The choice of the sub-word unit can depend on the language itself. For example, languages with a very well defined and small number of syllables may benefit from syllable sized unit.

Figure 1:
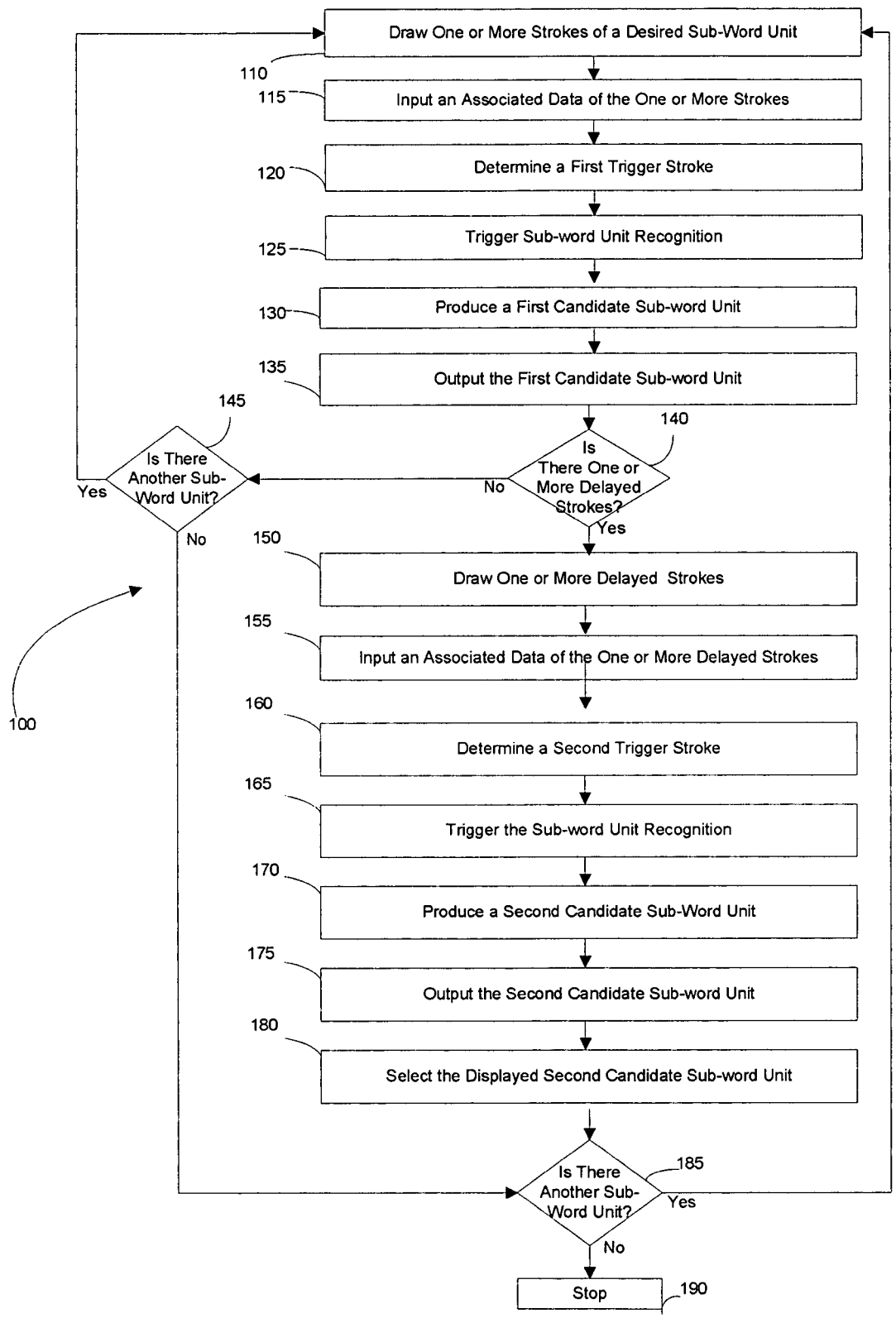
FIG. 1 is a flowchart illustrating an example method for triggering handwriting recognition according to an embodiment of the present subject matter.

FIG. 1 illustrates an example method 100 of triggering handwriting recognition when entering a sub-word unit into a computer. At step 110, this example method 100 begins by drawing one or more strokes of a desired sub-word unit using a stylus on a touch screen. In some embodiments, the step 110 begins by drawing one or more strokes of a desired shape using a stylus on a touch screen.

At step 115, an associated data of the drawn one or more strokes are inputted into a handwriting recognition engine via a touch screen. At step 120, a first trigger stroke in the drawn one or more strokes that can be used to trigger the sub-word unit recognition by the hand writing recognition engine is determined. The first trigger stroke signifies the completion of the writing of the sub-word unit and that detection can be used to trigger the handwriting recognition engine. In some embodiments, the step 115 includes dynamically inputting an associated data of the one or more strokes of the desired shape via the touch screen into the handwriting recognition engine. Also in these embodiments, the step 120 includes determining the trigger stroke in the drawn one or more stokes that can be used to trigger shape recognition by the handwriting recognition engine. In some embodiments, an associated data of the multiple strokes of a desired shape is substantially simultaneously inputted into the handwriting recognition engine.

In some embodiments, the handwriting recognition engine computes stroke recognition characteristics of each of the drawn one or more strokes with reference to a reference line. The first trigger stroke is then determined based as a function of the computed stroke recognition characteristics of each of the drawn one or more strokes. The stroke recognition characteristics can include stroke characteristics, such as aspect ratio, slope, and the like. In some embodiments, the stroke recognition characteristics are computed dynamically upon completion of drawing each stroke of a character, a sub-word unit and/or a shape.

At 125, sub-word unit recognition is triggered for the drawn one or more strokes based on the determined first trigger stroke by the handwriting recognition engine. At 130, a first candidate sub-word unit is produced upon triggering the sub-word unit recognition by the handwriting recognition engine. In some embodiments, the one or more trigger strokes in the drawn multiple strokes that can be used to trigger shape recognition are determined by the handwriting recognition engine. The shape recognition for the drawn shape is then triggered based on the determined one or more trigger strokes by the handwriting recognition engine.

At 135, the first candidate sub-word unit is outputted. The outputting of the first candidate shape can include transmitting the first candidate shape, printing the first candidate shape, displaying the first candidate shape, and so on. In some embodiments, a candidate shape is produced upon triggering the shape recognition by the handwriting recognition engine. In these embodiments, the candidate shape is outputted.

Figure 2:
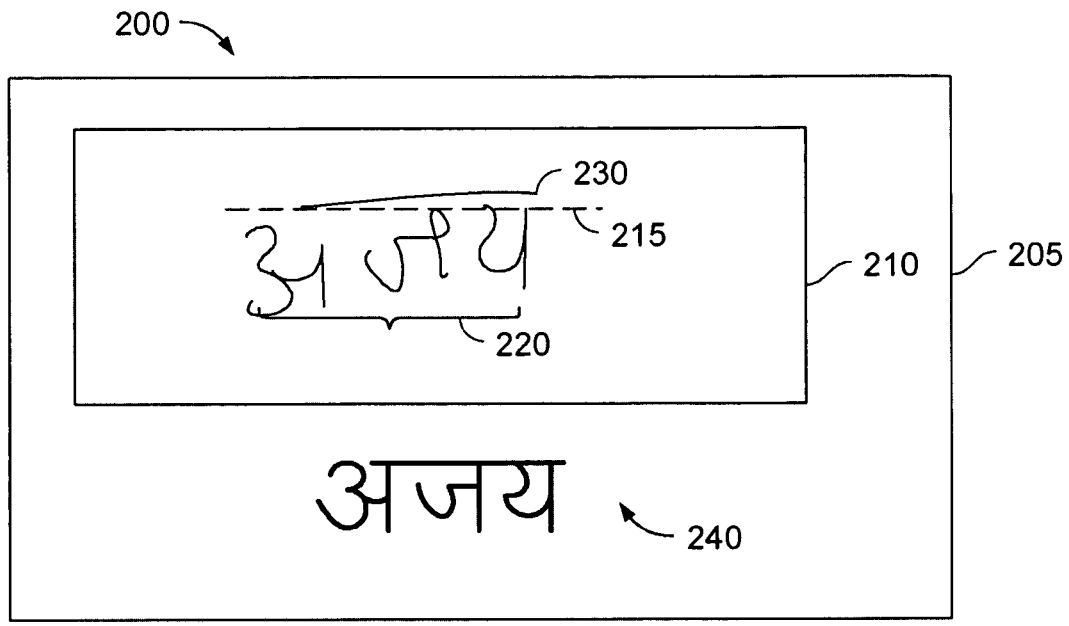
FIG. 2 is a screen shot representation that illustrates a drawn sub-word unit and displaying of a candidate sub-word unit produced by a handwriting recognition engine according to an embodiment of the present subject matter.

Referring now to FIG. 2, there is illustrated a screen shot 200 of a drawn sub-word unit 220 and displaying of a candidate sub-word 240 produced by the handwriting recognition engine. The screen shot 200 shown in FIG. 2 shows a handwriting task area 210 on a display screen 205 of a display device. The pen used for drawing the sub-word unit 220 in the handwriting task area 210 can be a stylus and the like. The handwriting task area 210 can be a touch screen and the like. Also shown in FIG. 2, is a reference line 215 that is used to compute stroke recognition characteristics of each drawn stroke. The stroke recognition characteristics, such as slope and/or aspect ratio of each drawn stroke is computed with respect to the reference line 215

It can be seen in FIG. 2 that the drawn sub-word unit 220, of a Devanagari akshara, requires four strokes, which includes a last stroke to draw a head-line 230 to complete the drawing of the sub-word unit 220. Upon completion of the drawing of the four strokes including the last stroke 230, i.e., the completion of the drawing of the trigger stroke, a handwriting recognition engine determines the drawn last stroke 230 as the trigger stroke based on the stroke recognition characteristics determined for each drawn stroke. The recognition of the drawn sub-word unit 220 is then triggered by the handwriting recognition engine upon determining the trigger stroke 230. The candidate shape 240 of the Devanagari akshara is then produced by the handwriting recognition engine upon triggering the sub-word unit recognition. As shown in FIG. 2, the produced candidate shape 240 is then displayed on a display screen 205.

At 140, the method determines whether there are one or more delayed strokes in the desired sub-word unit that need to be drawn. Based on the determination at 140, the method 100 goes to step 145 if there are no delayed strokes that needs to be drawn to complete the drawing of the desired sub-word unit. At 145, the method 100 determines whether there is another sub-word unit that needs to drawn. Based on the determination at 145, the method 100 goes to 110 and repeats the steps 110-140 if there is another sub-word unit that needs to be drawn. Based on the determination at 145, the method goes to step 190 and stops drawing sub-word units if there are no other sub-word units that need to be drawn.

Based on the determination at 140, the method 100 goes to step 150 if there are one or more delayed strokes that needs to be drawn for the desired sub-word unit. At 150, one or more delayed strokes of the sub-word unit are then drawn using the stylus on the touch screen. At 155, an associated data of the drawn delayed strokes of the sub-word unit is inputted into the handwriting recognition engine. At 160, a second trigger stroke that can be used to trigger the sub-word unit recognition is determined using the drawn one or more delayed strokes. At 165, the sub-word unit recognition is triggered for the drawn one or more delayed strokes based on the determined second trigger stroke by the handwriting recognition engine.

At 170, a second candidate sub-word unit is produced upon triggering the sub-word unit recognition by the character recognition engine. At 175, the second candidate sub-word unit is outputted. In some embodiments, the second candidate sub-word unit is displayed on the display screen 205. At 180, the displayed second candidate sub-word unit is selected by touching the displayed candidate sub-word unit on the display screen 205 using the stylus on the screen.

Figure 3:
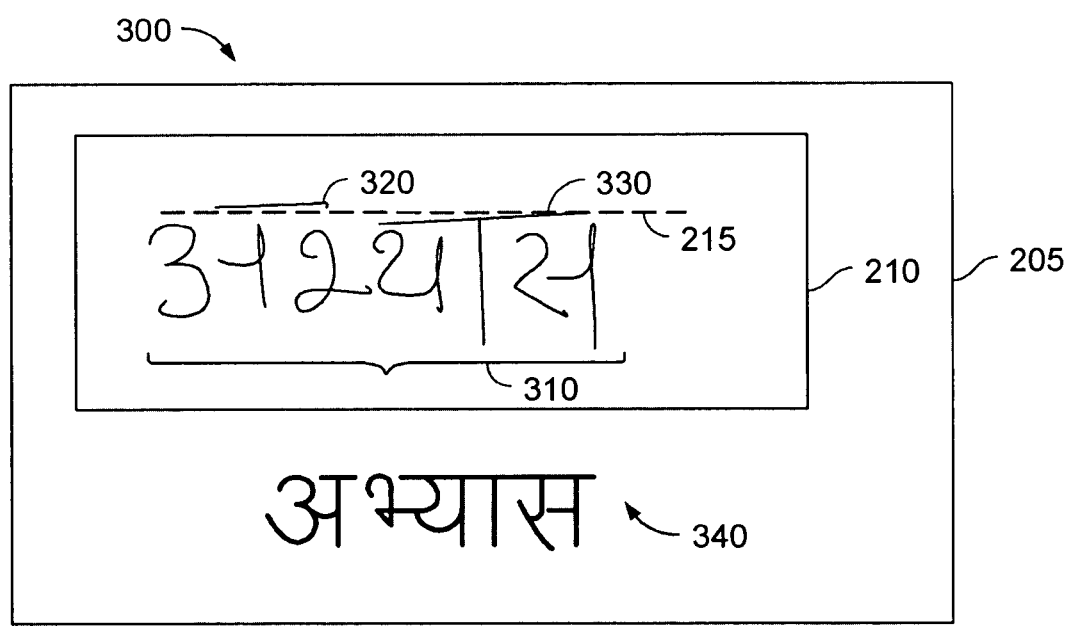
FIG. 3 is a screen shot representation that illustrates another drawn sub-word unit and displaying of a candidate sub-word unit produced by the handwriting recognition engine according to another embodiment of the present subject matter.

Referring now to FIG. 3, there is illustrated a screen shot 300 of a drawn sub-word unit 310 requiring a delayed stroke 330 and displaying of the candidate sub-word 340, including the delayed stroke, produced by the handwriting recognition engine. The screen shot 300 shown in FIG. 3 shows the handwriting task area 210 on the display screen 205 of a display device. The pen used for drawing the sub-word unit 310 can be a stylus and the like. The handwriting task area 210 can be a touch screen and the like.

It can be seen in FIG. 3 that the drawn sub-word unit 310 of a Devanagari akshara requires 9 strokes, which includes drawing two head-line strokes, a first head line stroke 320 and a second head line stroke 330 (delayed head-line stroke), to complete the drawing of the sub-word unit 310. Upon completion of the drawing of the two head-line strokes, the first head line stroke 320 and the delayed stroke 330, i.e., the completion of the drawing of the first and second trigger strokes, respectively, a handwriting recognition engine determines the drawn the second trigger stroke 330. Recognition of the drawn sub-word unit 310 is then triggered by the handwriting recognition engine upon determining the second trigger stroke 330. The candidate shape 340 of the Devanagari akshara is then produced by the handwriting recognition engine upon triggering the sub-word unit recognition. As shown in FIG. 3, the produced candidate shape 340 is then displayed on the display screen 205.

Figure 4:
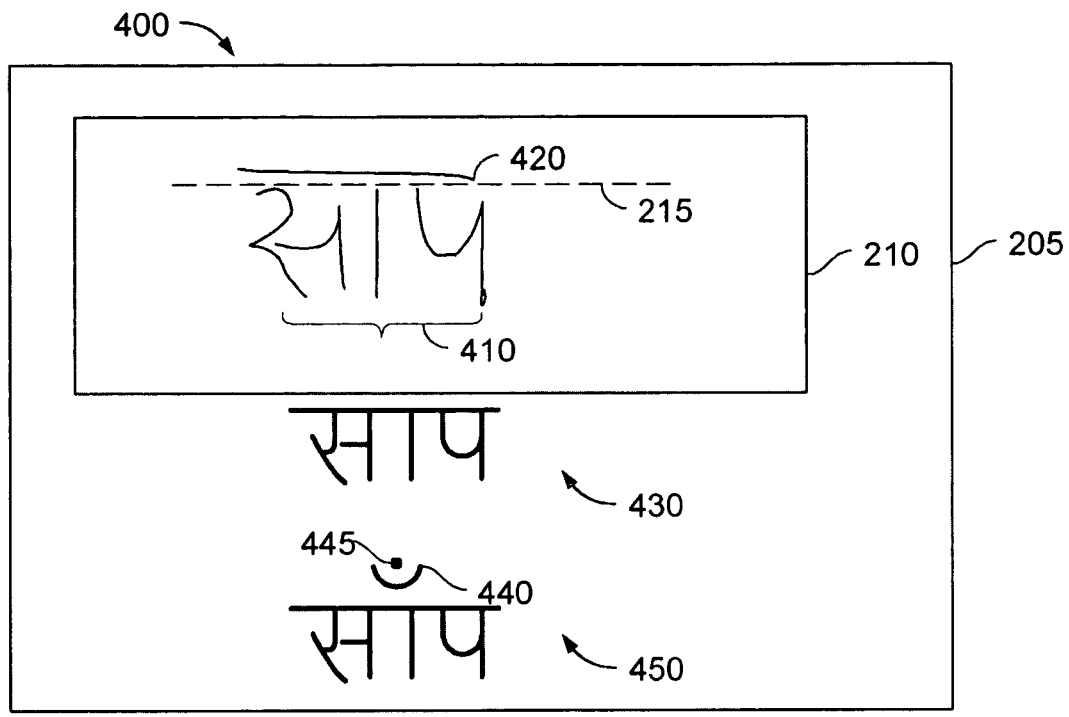
FIG. 4 is a screen shot representation that illustrates another drawn sub-word unit and displaying of a candidate sub-word unit produced by the handwriting recognition engine according to another embodiment of the present subject matter.

Referring now to FIG. 4, there is illustrated a screen shot 400 of a drawn sub-word unit 410 requiring drawing a head line stroke 420 and two delayed strokes 440 and 445 and displaying of the candidate sub-words 430 and 450, produced by the handwriting recognition engine. The screen shot 400 shown in FIG. 4 shows the handwriting task area 210 on the display screen 205 of a display device. The pen used for drawing the sub-word unit 410 can be a stylus and the like. The handwriting task area 210 can be a touch screen and the like.

It can be seen in FIG. 4 that the drawn sub-word unit 410 of a Devanagari akshara requires 7 strokes, which includes drawing a head-line stroke 420 and two delayed strokes 440 and 445, to complete the drawing of the sub-word unit 410. Upon completion of the drawing of the head-line stroke 420, a handwriting recognition engine determines the drawn head-line stroke, i.e., the first trigger stroke 420. The recognition of the drawn sub-word unit 410 is then triggered by the handwriting recognition engine upon determining the first trigger stroke 420. The first candidate shape 430 is then produced by the handwriting recognition engine upon triggering the sub-word unit recognition. As shown in FIG. 4, a first produced candidate sub-word unit 430 is then displayed on the display screen 205, since the sub-word unit 410 requires drawing two delayed strokes 440 and 445; the displayed first candidate sub-word unit 430 is incorrect. In these embodiments, the user can either draw the required delayed strokes 440 and 445 to produce a desired second candidate sub-word unit 450 or the handwriting recognition engine can be designed to automatically produce the desired second sub-word unit 450 as shown in FIG. 4.

Figure 5:
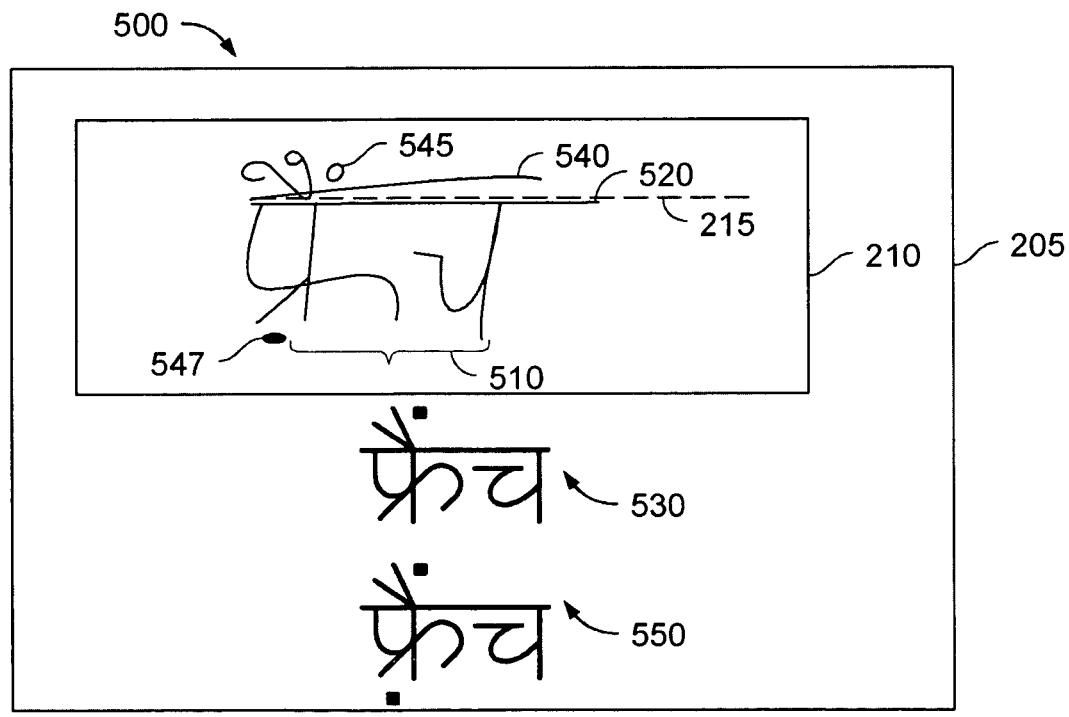
FIG. 5 is a screen shot representation that illustrates another drawn sub-word unit and displaying of a candidate sub-word unit produced by the handwriting recognition engine according to another embodiment of the present subject matter.

Referring now to FIG. 5, there is illustrated a screen shot 500 of a drawn sub-word unit 510, requiring drawing two head line strokes 520 and 540 and two delayed strokes 545 and 547, and displaying of the candidate sub-words 530 and 550, produced by the handwriting recognition engine. The screen shot 500 shown in FIG. 5 shows the handwriting task area 210 on the display screen 205 of a display device. The pen used for drawing the sub-word unit 510 can be a stylus and the like. The handwriting task area 210 can be a touch screen and the like.

It can be seen in FIG. 5 that the drawn sub-word unit 510 of a Devanagari akshara requires 10 strokes, which includes drawing the two head-line strokes 520 and 540 and the two delayed strokes 545 and 547, to complete the drawing of the sub-word unit 510. Upon completion of the drawing of the first head-line stroke 520, a handwriting recognition engine determines the drawn first head-line stoke, i.e., the first trigger stroke 520, based on computed stroke recognition characteristics. The recognition of the drawn sub-word unit 510 is then triggered by the handwriting recognition engine upon determining the first trigger stroke 520. A first candidate shape 530 is then produced by the handwriting recognition engine upon triggering the sub-word unit recognition. As shown in FIG. 5, the produced candidate shape 530 is then displayed on the display screen 205.

Since the sub-word unit 510 shown in FIG. 5 requires drawing two delayed strokes 545 and 547, the displayed first candidate sub-word unit 530 is incorrect. In these embodiments, the user draws the required delayed strokes 545 and 547 and then followed by drawing the second head-line stroke 540. Upon completion of the drawing of the second head-line stroke 540, the handwriting recognition engine determines the drawn second head-line stoke 540, i.e., the second trigger stroke 540, based on computing stroke recognition characteristics with reference to a reference line 215. The recognition of the drawn sub-word unit 510 is then again triggered by the handwriting recognition engine upon determining the second trigger stroke 540. A second candidate shape 550 is then produced by the handwriting recognition engine upon triggering the sub-word unit recognition. As shown in FIG. 5, the produced second candidate shape 550 is then displayed on the display screen 205.

Figure 6:
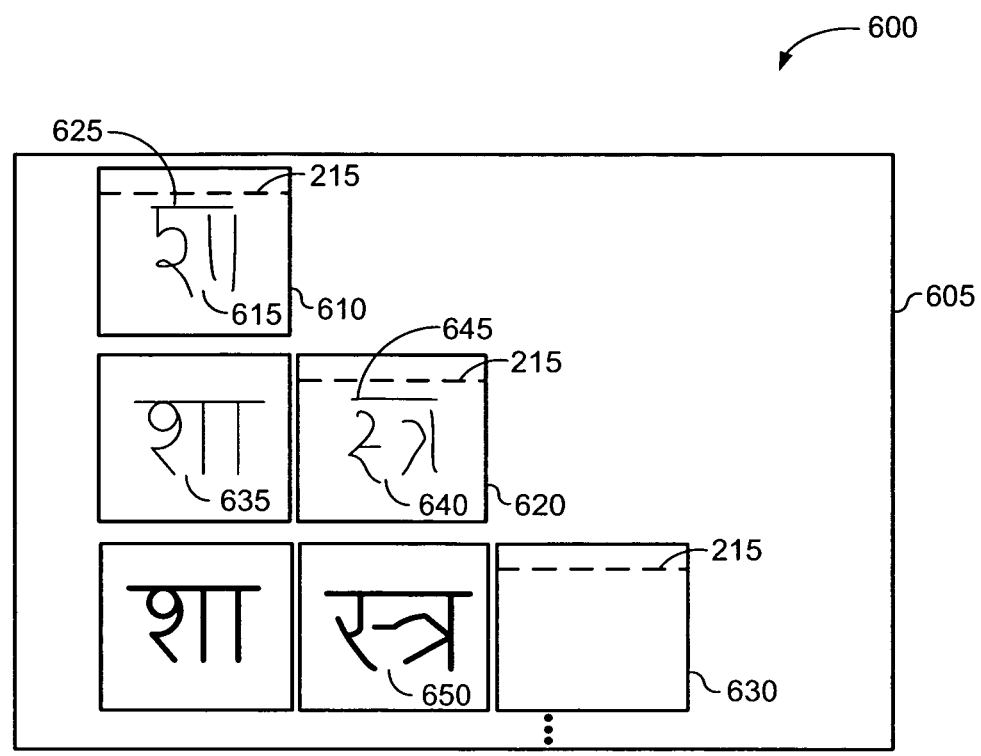
FIG. 6 is a screen shot representation that illustrate drawn sub-word units and displaying of associated candidate sub-word units produced by the handwriting recognition engine according to another embodiment of the present subject matter.

Referring now to FIG. 6, there is illustrated a screen shot 600 of drawing a character in a character cluster-level entry format. All of the above-described character word-level entries with reference to FIGS. 1-5 are applicable to the character-level entry shown in FIG. 6. As shown in FIG. 6, the display screen 605 includes first, second, and third handwriting task areas 610, 620, and 630. It can be envisioned that the handwriting task areas can continue beyond the shown first, second and third handwriting task areas 610, 620, and 630 to enter desired shapes, words and/or numbers required in a cluster-level entry, such as an application form. It can be seen in FIG. 6 that upon completion of drawing the head-line strokes 625 and 645 of a desired Devanagari aksharas 615 and 640 in the first and second handwriting task areas 610 and 620, the handwriting recognition engine sequentially determines the associated triggered strokes and produces candidate first and second Devanagari aksharas 635 and 650, respectively.

At 185, the method 100 determines whether there is another sub-word unit that needs to be drawn. Based on the determination at 185, the method goes to step 110, if there is another sub-word unit that needs to be drawn. Based on the determination at 185, the method 100 goes to step 190, if the are no other sub-word units that needs to be drawn. At 190, the method 100 stops drawing the sub-word unit.

Although the flowchart 100 includes steps 110-190 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Various embodiments of the present subject matter can be implemented in software, which may be run in the environment shown in FIG. 7 (to be described below) or in any other suitable computing environment. The embodiments of the present subject matter are operable in a number of general-purpose or special-purpose computing environments. Some computing environments include personal computers, general-purpose computers, server computers, hand-held devices (including, but not limited to, telephones and personal digital assistants (PDAs) of all types), laptop devices, multi-processors, microprocessors, set-top boxes, programmable consumer electronics, network computers, minicomputers, mainframe computers, distributed computing environments and the like to execute code stored on a computer-readable medium. The embodiments of the present subject matter may be implemented in part or in whole as machine-executable instructions, such as program modules that are executed by a computer. Generally, program modules include routines, programs, objects, components, data structures, and the like to perform particular tasks or to implement particular abstract data types. In a distributed computing environment, program modules may be located in local or remote storage devices.

Figure 7:
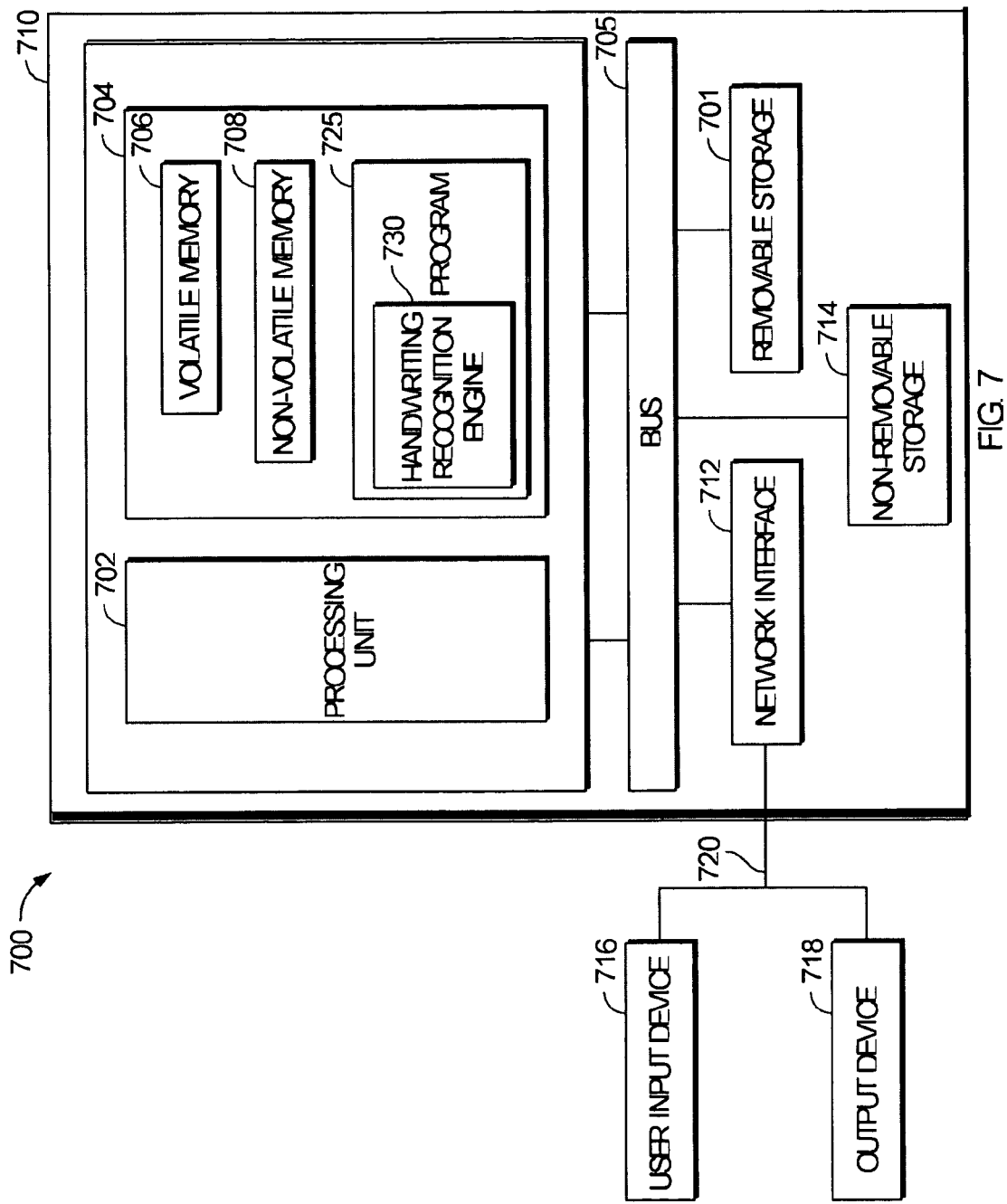
FIG. 7 is a block diagram of a typical computer system used for implementing embodiments of the present subject matter, such as those shown in FIGS. 1-6.

FIG. 7 shows an example of a suitable computing system environment for implementing embodiments of the present subject matter. FIG. 7 and the following discussion are intended to provide a brief, general description of a suitable computing environment in which certain embodiments of the inventive concepts contained herein may be implemented.

A general computing device, in the form of a computer 710, may include a processing unit 702, memory 704, removable storage 701, and non-removable storage 714. Computer 710 additionally includes a bus 705 and a network interface (NI) 712.

Computer 710 may include or have access to a computing environment that includes one or more user input devices 716, one or more output devices 718, and one or more communication connections 720 such as a network interface card or a USB connection. The one or more user input devices 716 can be a touch screen and a stylus and the like. The one or more output devices 718 can be a display device of computer, computer monitor, TV screen, plasma display, LCD display, display on a touch screen, display on an electronic tablet, and the like. The computer 710 may operate in a networked environment using the communication connection 720 to connect to one or more remote computers. A remote computer may include a personal computer, server, router, network PC, a peer device or other network node, and/or the like. The communication connection may include a Local Area Network (LAN), a Wide Area Network (WAN), and/or other networks.

The memory 704 may include volatile memory 706 and non-volatile memory 708. A variety of computer-readable media may be stored in and accessed from the memory elements of computer 710, such as volatile memory 706 and non-volatile memory 708, removable storage 701 and non-removable storage 714. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 702 of the computer 710. For example, a computer program 725 may include machine-readable instructions capable of triggering handwriting recognition according to the teachings and herein described embodiments of the present subject matter. In one embodiment, the computer program 725 may be included on a CD-ROM and loaded from the CD-ROM to a hard drive in non-volatile memory 708. The machine-readable instructions cause the computer 710 to encode according to the various embodiments of the present subject matter. As shown, the computer program 725 includes a handwriting recognition engine 730.

In operation, the user input device 716 draws one or more strokes of a desired sub-word unit. The handwriting recognition engine 730 coupled to the user input device 716 that is responsive to the one or more strokes of the desired character determines a first trigger stroke in the drawn one or more strokes that can be used to trigger the sub-word unit recognition upon recognition of the one or more strokes. The handwriting recognition engine 730 then triggers sub-word unit recognition for the drawn one or more strokes based on the determined first trigger stroke. The handwriting recognition engine 730 then produces a first candidate sub-word unit upon triggering the sub-word unit. The output device 716 then displays the produced first candidate sub-word unit. The user input device 716 then selects the displayed first candidate sub-word unit by touching the displayed first candidate sub-word unit.

The operation of the computer system 700 for triggering the handwriting recognition is explained in more detail with reference to FIGS. 1-6.

The handwriting recognition engine of the present subject matter is modular and flexible in terms of usage in the form of a "Distributed Configurable Architecture". As a result, parts of the handwriting recognition engine may be placed at different points of a network, depending on the model chosen. For example, the handwriting recognition engine can be deployed in a server and the input and output data elements streamed over from a client to the server and back, respectively. The handwriting recognition engine can also be placed on each client, with the database management centralized. Such flexibility allows faster deployment to provide a cost effective solution to changing business needs. Further, the above-described technique utilizes certain parts of a sub-word unit that are repetitive, which is natural to a user and does not require learning any scheme, to trigger handwriting recognition. Basically, the above-described technique uses parts of writing to reliably recognize the completion of the writing of the sub-word unit, which can be used to trigger the handwriting recognition. The technique requires the users to write the usually way they are used to write sub-words and does not require them to learn any new techniques and thus provides a better user's experience when drawing a sub-word unit and entering the drawn sub-word unit into a computer.

The above description is intended to be illustrative, and not restrictive. Many other embodiments will be apparent to those skilled in the art. The scope of the subject matter should therefore be determined by the appended claims, along with the full scope of equivalents to which such claims are entitled.

The above-described technique provides various embodiments for triggering handwriting recognition. It is to be understood that the above-description is intended to be illustrative, and not restrictive. Many other embodiments will be apparent to those of skill in the art upon reviewing the above-description. The scope of the subject matter should, therefore, be determined with reference to the following claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the method illustrated in FIG. 1 can be performed in a different order from those shown and described herein.

FIGS. 1-7 are merely representational and are not drawn to scale. Certain proportions thereof may be exaggerated, while others may be minimized. FIGS. 1-7 illustrate various embodiments of the subject matter that can be understood and appropriately carried out by those of ordinary skill in the art.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A method comprising:
   drawing one or more strokes of a desired shape using a stylus on a touch screen, wherein one of the drawn one or more strokes is a head-line stroke and is a last drawn stroke of the desired shape;
   dynamically inputting an associated data of the one or more strokes via the touch screen into a handwriting recognition engine;
   computing stroke recognition characteristics of each of the drawn one or more strokes with reference to a horizontal reference line, wherein the stroke recognition characteristics are selected from the group comprising aspect ratio and slope;
   determining a trigger stroke in the drawn one or more strokes of the desired shape that can be used to trigger shape recognition based as a function of the computed stroke recognition characteristics of each of the drawn one or more strokes, wherein the trigger stroke is the head-line stroke which is drawn substantially parallel to the horizontal reference line; and
   triggering shape recognition for the desired shape by the handwriting recognition engine upon determining the trigger stroke.

2. The method of claim 1, further comprising:
   producing a candidate shape upon triggering the shape recognition by the handwriting recognition engine; and
   outputting the candidate shape.

3. The method of claim 2, wherein, in outputting the candidate shape, the output is selected from the group comprising transmitting, printing, and displaying.

4. The method of claim 2, further comprising: repeating the drawing, inputting, triggering, producing, and outputting steps to enter a next shape.

5. The method of claim 1, wherein the desired shape is a Devanagari script.

6. A method comprising:
   drawing multiple strokes of a desired shape using a stylus on a touch screen, wherein one or more of the drawn multiple strokes are head-line strokes and are last drawn strokes of the desired shape;
   substantially simultaneously inputting an associated data of the multiple strokes via the touch screen into a handwriting recognition engine;
   computing stroke recognition characteristics of each of the drawn multiple strokes with reference to a horizontal reference line, wherein the stroke recognition characteristics are selected from the group comprising aspect ratio and slope;
   determining one or more trigger strokes in the drawn multiple strokes of the desired shape that can be used to trigger shape recognition based as a function of the computed stroke recognition characteristics of each of the multiple drawn strokes, wherein the one or more trigger stroke are the head-line stroke which are drawn substantially parallel to the horizontal reference line; and
   triggering shape recognition for the desired shape by the handwriting recognition engine upon determining the one or more trigger strokes.

7. The method of claim 6, further comprising:
   producing a candidate shape upon triggering the shape recognition by the handwriting recognition engine; and
   outputting the candidate shape.

8. The method of claim 7, wherein, in outputting the candidate shape, the output is selected from the group comprising transmitting, printing, and displaying.

9. A method for triggering a sub-word unit recognition comprising:
   drawing one or more strokes of a desired sub-word unit using a stylus on a touch screen, wherein one of the drawn one or more strokes is a first head-line stroke and is a last drawn stroke in the drawn one or more strokes of the desired sub-word unit;
   inputting an associated data of the drawn one or more strokes via the touch screen into a handwriting recognition engine;
   computing stroke recognition characteristics of each of the drawn one or more strokes with reference to a horizontal reference line, wherein the stroke recognition characteristics are selected from the group comprising aspect ratio and slope;
   determining a first trigger stroke in the drawn one or more strokes of the desired sub-word unit that can be used to trigger the sub-word unit recognition based as a function of the computed stroke recognition characteristics of each of the multiple drawn strokes, wherein the first trigger stroke is the first head-line stroke which is drawn substantially parallel to the horizontal reference line; and
   triggering sub-word unit recognition for the drawn one or more strokes by the handwriting recognition engine upon determining the first trigger stroke.

10. The method of claim 9, further comprising:
producing a first candidate sub-word unit upon triggering the sub-word unit recognition by the handwriting recognition engine; and
outputting the first candidate sub-word unit.

11. The method of claim 10, wherein, in outputting the first candidate sub-word unit, the output is selected from the group comprising transmitting, printing, and displaying.

12. The method of claim 9, further comprising: repeating the drawing, inputting, triggering, producing, and outputting steps to enter a next sub-word unit.

13. The method of claim 9, further comprising:
drawing one or more delayed strokes of the desired sub-word unit using the stylus on the touch screen, wherein one of the drawn one or more delayed strokes is a second head-line stroke and is a last drawn stroke in the drawn one or more delayed strokes of the desired sub-word unit;
inputting an associated data of the drawn delayed strokes via the touch screen into the handwriting recognition engine;
determining a second trigger stroke of the desired sub-word unit that can be used to trigger the sub-word unit recognition using the drawn one or more delayed strokes, wherein the second trigger stroke is the second head-line stroke which is drawn substantially parallel to the horizontal reference line; and
triggering the sub-word unit recognition for the drawn one or more delayed strokes by the handwriting recognition engine upon determining the second trigger stroke.

14. The method of claim 13, further comprising:
producing a second candidate sub-word unit upon triggering the sub-word unit recognition by the handwriting recognition engine; and
outputting the second candidate sub-word unit.

15. The method of claim 14, wherein outputting the second candidate sub-word unit comprises displaying the second candidate sub-word unit.

16. The method of claim 14, further comprising:
selecting the displayed second candidate sub-word unit by touching the displayed candidate sub-word unit using the stylus on the screen.

17. The method of claim 9, wherein the sub-word unit is selected from the group comprising vowels, consonants, consonant modifiers, vowel modifiers, numerals, and special characters.

18. The method of claim 9, wherein, in determining the first trigger stroke and the second trigger stroke, the first trigger stroke and the second trigger stroke are associated with drawing a punctuation mark, head line of the sub-word unit, a repetitive stroke of the sub word unit, and reliably recognizable stroke of the sub-word unit.

19. A method comprising:
drawing one or more strokes of a current desired character using a stylus on a current handwriting task area in a touch screen, wherein one of the drawn one or more strokes is a head-line stroke and is a last drawn stroke of the current desired character;
inputting an associated data of the one or more strokes via the touch screen into a handwriting recognition engine;
computing stroke recognition characteristics of each of the drawn one or more strokes with reference to a horizontal reference line, wherein the stroke recognition characteristics are selected from the group comprising aspect ratio and slope;
determining a trigger stroke in the drawn one or more strokes of the current desired character that can be used to trigger character recognition based as a function of the computed stroke recognition characteristics of each of the drawn one or more strokes, wherein the trigger stroke is the head-line stroke which is drawn substantially parallel to the horizontal reference line; and
triggering character recognition for the drawn current desired character by the handwriting recognition engine upon determining the trigger stroke.

20. The method of claim 19, further comprising:
producing a current candidate character upon triggering the character recognition by the handwriting recognition engine in the current handwriting task area; and
displaying the current candidate character in the current handwriting task area.

21. The method of claim 19, further comprising:
providing a next handwriting task area for drawing one or more next desired character upon displaying the current candidate character in the current handwriting task area; and
repeating the drawing, inputting, determining, triggering, producing, and displaying steps for the next desired character.

22. The method of claim 19, wherein the current desired character is a character in a Devanagari script.

23. A method for triggering sub-word unit recognition in Devanagari script comprising:
drawing one or more strokes followed of a desired sub-word unit in the Devanagari script using a stylus on a touch screen, wherein one of the drawn one or more strokes is a head-line stroke and is a last drawn stroke of the desired sub-word unit in the Devanagari script;
inputting an associated data of each of the drawn one or more strokes via the touch screen into a handwriting recognition engine;
comparing each drawn stroke to a horizontal reference line;
dynamically computing stroke characteristics of each drawn one or more strokes based on the comparison, wherein, in dynamically computing stroke characteristics, the stroke characteristics are selected from the group comprising aspect ratio and slope;
determining the head-line stroke in the drawn one or more strokes followed of the desired sub-word unit that can be used to trigger the sub-word unit recognition based on the computed stroke characteristics, wherein the head line stroke is drawn substantially parallel to the horizontal reference line; and
triggering sub-word unit recognition for the drawn one or more strokes upon determining the head-line stroke by the handwriting recognition engine.

24. The method of claim 23, further comprising:
producing a first candidate sub-word unit upon triggering the sub-word unit recognition by the handwriting recognition engine; and
outputting the first candidate sub-word unit.

25. An article comprising:
a non-transitory computer-readable medium having instructions that, when executed by a computing platform, result in execution of a method comprising:
drawing one or more strokes of a desired shape using a stylus on a touch screen, wherein one of the drawn one or more strokes is a head-line stroke and is a last drawn stroke of the desired shape;
inputting an associated data of the drawn one or more strokes via the touch screen into a handwriting recognition engine;
computing stroke recognition characteristics of each of the drawn one or more strokes with reference to a horizontal reference line, wherein the stroke recognition characteristics are selected from the group comprising aspect ratio and slope;

determining a trigger stroke in the drawn one or more strokes of the desired shape that can be used to trigger shape recognition based as a function of the computed stroke recognition characteristics of each of the drawn one or more strokes, wherein the trigger stroke is the head-line stroke which is drawn substantially parallel to the horizontal reference line; and triggering shape recognition for the desired shape by the handwriting recognition engine upon determining the trigger stroke.

26. The article of claim 25, further comprising:
producing a candidate shape upon triggering the shape recognition by the handwriting recognition engine; and
outputting the candidate shape.

27. The article of claim 25, wherein, in outputting the candidate shape, the output is selected from the group comprising transmitting, printing, and displaying.

28. The article of claim 25, further comprising: repeating the drawing, inputting, triggering, producing, and outputting steps to enter a next shape.

29. An apparatus for handwriting recognition trigger comprising:
a touch screen and a pen for drawing one or more strokes of a desired sub-word unit, wherein one of the drawn one or more strokes is a first head-line stroke and is a last drawn stroke in the drawn one or more strokes of the desired sub-word unit;
a handwriting recognition engine coupled to the touch screen that is responsive to the one or more strokes of the desired sub-word unit, wherein the handwriting recognition engine computes stroke recognition characteristics of each of the drawn one or more strokes with reference to a horizontal reference line, wherein the stroke recognition characteristics are selected from the group comprising aspect ratio and slope, determines a first trigger stroke in the drawn one or more strokes of the desired sub-word unit that can be used to trigger the desired sub-word unit recognition based as a function of the computed stroke recognition characteristics of each of the multiple drawn strokes, wherein the first trigger stroke is the first head-line stroke which is drawn substantially parallel to the horizontal reference line, and triggers sub-word unit recognition for the drawn one or more strokes based on the determined first trigger stroke, and wherein the handwriting recognition engine to produce a first candidate sub-word unit upon triggering the sub-word unit recognition; and
a display device coupled to the handwriting recognition engine to display the produced first candidate sub-word unit.

30. The apparatus of claim 29, wherein the stylus selects the displayed first candidate sub-word unit by touching the displayed first candidate sub-word unit.

31. The apparatus of claim 29, wherein the touch screen and the pen that draws one or more delayed strokes of the desired sub-word unit, and wherein one of the drawn one or more delayed strokes is a second head-line stroke and is a last drawn stroke in the drawn one or more delayed strokes of the desired sub-word unit, and wherein the handwriting recognition engine determines a second trigger stroke in the drawn one or more strokes that can be used to trigger the sub-word unit recognition upon recognition of the one or more delayed strokes, and wherein the second trigger stroke is the second head-line stroke which is drawn substantially parallel to the horizontal reference line, wherein the handwriting recognition engine triggers sub-word unit recognition for the drawn one or more delayed strokes based on the determined second trigger stroke, wherein the handwriting recognition engine to produce a second candidate sub-word unit upon triggering the sub-word unit recognition, and wherein the display device displays the produced second candidate sub-word unit.

32. The apparatus of claim 29, wherein the display device is a device selected from the group comprising computer monitor, TV screen, plasma display, LCD, display on an electronic tablet.

33. A computer system for triggering handwriting recognition comprising:
a network interface;
an input module coupled to the network interface that receives the input data via the network interface;
a processing unit;
a memory coupled to the processing unit;
a user input device for drawing one or more strokes of a desired sub-word unit, wherein one of the drawn one or more strokes is a first head-line stroke and is a last drawn stroke of the desired sub-word unit;
a handwriting recognition engine coupled to the user input device that is responsive to the one or more strokes of the desired sub-word unit, wherein the handwriting recognition engine computes stroke recognition characteristics of each of the drawn one or more strokes with reference to a horizontal reference line, wherein the stroke recognition characteristics are selected from the group comprising aspect ratio and slope, determines a first trigger stroke in the drawn one or more strokes of the desired sub-word unit that can be used to trigger the sub-word unit recognition based as a function of the computed stroke recognition characteristics of each of the multiple drawn strokes, wherein the first trigger stroke is the first head-line stroke which is drawn substantially parallel to the horizontal reference line, and triggers sub-word unit recognition for the drawn one or more strokes based on the determined first trigger stroke, and wherein the handwriting recognition engine to produce a first candidate sub-word unit upon triggering the sub-word unit recognition; and
an output device coupled to the handwriting recognition engine to display the produced first candidate sub-word unit.

34. The system of claim 33, wherein the user input device selects the displayed first candidate sub-word unit by touching the displayed first candidate sub-word unit.

35. The system of claim 33, wherein the display device is a device selected from the group comprising computer monitor, TV screen, plasma display, LCD, display on an electronic tablet.

* * * * *

UNITED STATES PATENT AND TRADEMARK OFFICE
CERTIFICATE OF CORRECTION

PATENT NO.       : 8,849,034 B2  Page 1 of 1
APPLICATION NO.  : 11/008434
DATED            : September 30, 2014
INVENTOR(S)      : Ajay Bhaskarabhatla It is certified that error appears in the above-identified patent and that said Letters Patent is hereby corrected as shown below:

In the Claims,

In column 11, line 37, in Claim 15, delete "comprises" and insert -- comprises: --, therefor.

In column 11, line 51, in Claim 18, delete "sub word" and insert -- sub-word --, therefor.

Signed and Sealed this
Twentieth Day of January, 2015

Michelle K. Lee
*Deputy Director of the United States Patent and Trademark Office*